United States Patent [19]

Thomas

[11] Patent Number: 5,509,325
[45] Date of Patent: Apr. 23, 1996

[54] STEERING COLUMN ASSEMBLY

[75] Inventor: Robert M. Thomas, South Lyon, Mich.

[73] Assignee: Chrysler Corporation, Highland Park, Mich.

[21] Appl. No.: 245,276

[22] Filed: May 18, 1994

[51] Int. Cl.[6] .................................. B62D 1/18; F16B 3/00
[52] U.S. Cl. ............................ 74/493; 280/775; 403/282
[58] Field of Search .............................. 74/493; 280/775; 403/282, 298, 359

[56] References Cited

U.S. PATENT DOCUMENTS

| | | | |
|---|---|---|---|
| 2,761,713 | 9/1956 | Schulze | 403/359 X |
| 4,117,741 | 10/1978 | Yazane et al. | 74/492 |
| 4,118,134 | 10/1978 | Mansel | 403/282 |
| 4,630,498 | 12/1986 | Santi | 403/282 X |
| 4,728,216 | 3/1988 | Disborg | 403/282 |
| 5,090,730 | 2/1992 | Durocher et al. | 280/775 |
| 5,239,889 | 8/1993 | Hancock | 74/493 |

Primary Examiner—Allan D. Herrmann
Attorney, Agent, or Firm—Edward A. Craig

[57] ABSTRACT

A steering column assembly for a collapsible energy absorbing steering column includes a lower support bracket for pivotally attaching a lower portion of the steering column to vehicle support structure. The steering column assembly includes an upper mounting mechanism for pivotally attaching an upper portion of the steering column to vehicle support structure. The steering column assembly includes a locking structure for locking the steering column in a plurality of tilt positions relative to the upper mounting mechanism. The steering column assembly further includes tilt release lever assembly for actuating the locking structure to allow the steering column to be tilted to a desired position and locked in place. The tilt release lever assembly includes a tilt release lever being made as one-piece from a plastic material.

9 Claims, 5 Drawing Sheets

STEERING COLUMN ASSEMBLY

BACKGROUND OF THE INVENTION

1. Field of the Invention

The present invention relates generally to steering columns for automotive vehicles, and more particularly to a collapsible energy absorbing steering column assembly for an automotive vehicle.

2. Description of the Related Art

It has been known to provide various collapsible and energy absorbing steering columns in automotive vehicles to reduce injury to a driver during a collision type impact of the automotive vehicle. An example of such a collapsible energy absorbing steering column is disclosed in U.S. Pat. No. 4,117,741 to Yazane et al.

Accordingly, there has been a need in the art to provide a steering column assembly which absorbs energy during a collision of the automotive vehicle. There has also been a need in the art to provide a steering column assembly which guides movement of the steering column along a predetermined path during a collision. Further, there has been a need in the art to provide a steering column assembly which yields a relatively constant force versus deflection during a collision.

SUMMARY OF THE INVENTION

It is, therefore, one object of the present invention to provide a steering column assembly for an automotive vehicle. It is another object of the present invention to provide a steering column assembly which absorbs energy of the steering column during a collision.

It is yet another object of the present invention to provide a steering column assembly which guides movement of the steering column along a predetermined path during a collision.

It is still another object of the present invention to provide a steering column assembly which yields a relatively constant force versus deflection during a collision type impact.

It is another object of the present invention to provide a steering column assembly which moves downwardly away from an operator during a collision.

It is a further object of the present invention to provide a steering column assembly for a collapsible energy absorbing vehicle steering column which is of a tilt type that has a release lever requiring fewer parts.

To achieve the foregoing objects, the present invention is a steering column assembly for a collapsible energy absorbing vehicle steering column including a lower support bracket for pivotally attaching a lower portion of the steering column to vehicle support structure. The steering column assembly also includes an upper mounting mechanism for attaching an upper support portion of the steering column to vehicle support structure. The lower bracket includes means for absorbing energy of the steering column and for guiding movement of the steering column along a predetermined path during a collision.

Also, the present invention is a steering column assembly for a collapsible energy absorbing vehicle steering column including a lower support bracket for pivotally attaching a lower portion of the steering column to vehicle support structure. The steering column assembly also includes an upper mounting mechanism for attaching an upper portion of the steering column to vehicle support structure. The upper mounting mechanism includes means for guiding movement of the steering column along an arcuate path during a collision.

Further, the present invention is a steering column assembly for a collapsible energy absorbing steering column including a lower support bracket for pivotally attaching a lower portion of the steering column to vehicle support structure. The steering column assembly includes an upper mounting mechanism for pivotally attaching an upper portion of the steering column to vehicle support structure. The steering column assembly includes locking means for locking the steering column in a plurality of tilt positions relative to the upper mounting mechanism. The steering column assembly further includes tilt release lever means for actuating the locking means to allow the steering column to be tilted to a desired position and locked in place. The tilt release lever means includes a tilt release lever being made as one-piece from a plastic material.

One advantage of the present invention is that a steering column assembly is provided for a collapsible energy absorbing steering column in an automotive vehicle. Another advantage of the present invention is that a lower support bracket is provided which absorbs energy of the steering column and guides movement of the steering column along a predetermined path during a collision. Yet another advantage of the present invention is that the lower support bracket yields a relatively constant force versus deflection during a collision. Still another advantage of the present invention is that an upper mounting mechanism guides the steering column downwardly along an arcuate path away from the operator during a collision. A further advantage of the present invention is that a tilt release lever assembly is provided which requires fewer parts.

Other objects, features and advantages of the present invention will be readily appreciated as the same becomes better understood after reading the following description taken in conjunction with the accompanying drawings.

BRIEF DESCRIPTION OF THE DRAWINGS

FIG. 3 is a view similar to FIG. 1 rotated ninety degrees.

DESCRIPTION OF THE PREFERRED EMBODIMENT(S)

Figure 1:
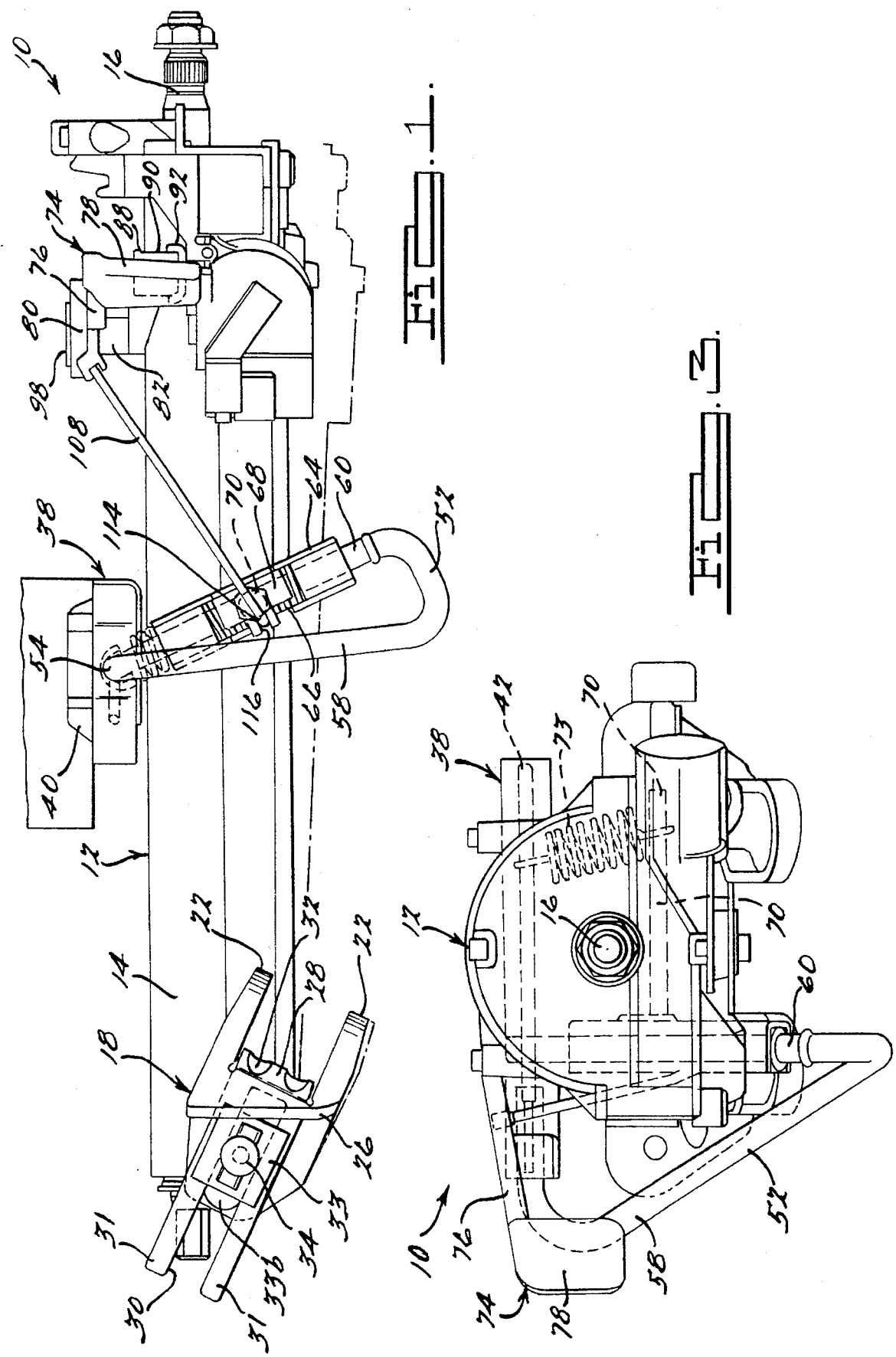
FIG. 1 is an elevational view of a steering column assembly according to the present invention.
Figure 2:
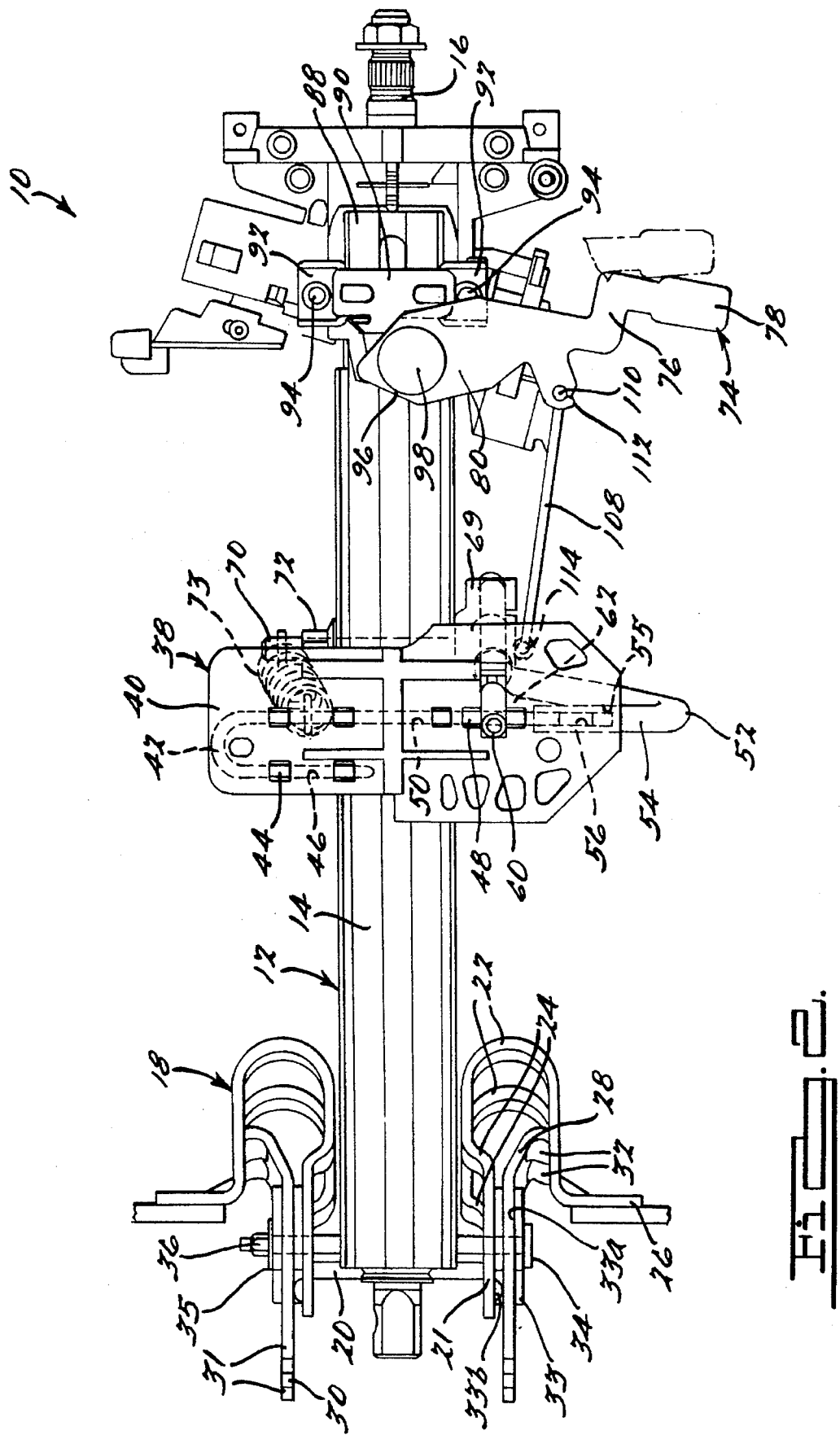
FIG. 2 is a plan view of the steering column assembly of FIG. 1.

Referring now to the drawings, especially to FIGS. 1 through 3, a steering column assembly 10 is generally shown for an automotive vehicle (not shown). The steering column assembly 10 includes a steering column, generally indicated at 12, of the collapsible energy absorbing type. The steering column 12 includes a rigid sleeve 14 made of a metal material such as aluminum or an alloy thereof. The sleeve 14 has a generally bell-shaped configuration. The steering column 12 also includes a steering shaft 16 made of a metal material such as aluminum or an alloy thereof which is connected to a steering wheel assembly (not shown) at its upper end and to a shaft coupler (not shown) at its lower end. It should be appreciated that the shaft coupler is operably connected to a steering gear assembly (not shown) for steering of the wheels of the automotive vehicle.

The steering column assembly 10 includes a lower support bracket, generally indicated at 18, for pivotally attaching and supporting a lower portion of the steering column 12 to vehicle support structure such as a dash panel (not shown) of the automotive vehicle. The lower support bracket 18 also allows the steering column 12 to absorb impact of a collision when an operator's body is thrust at the steering column 12 and controls the motion of the lower portion of the steering column 12.

The lower support bracket 18 has a cross-strap 20 at one end extending laterally and generally perpendicular to a longitudinal axis of the steering column 12. The lower support bracket 18 also has a side member 21 extending longitudinally from each lateral end of the cross-strap 20. The side members 21 have a generally rectangular shape. The lower support bracket 18 further has, at least one, preferably a pair of energy absorbing loops 22 extending longitudinally from each side member 21. The loops 22 have a force reduction offset 24 extending laterally toward the steering column 12 to offset the loops 22 closer to the steering column 12 than the side members 21. The force reduction offsets 24 setup the initial bend direction of the loops 22 and offset a release force of capsule insert tabs 33 to be described. The loops 22 are spaced from each other and have a generally inverted U shape. The width of the loops 22 determine the force at which the steering column 12 will collapse during a collision and absorb energy during impact stroking of the steering column 12. The loops 22 also direct the motion of the steering column 12 during impact. The dynamic impact forces and column kinematics can be adjusted by varying the width and/or height of the loops 22, the thickness of the loops 22, the radius of the bend in the loops 22 and the material used for the loops 22. It should be appreciated that the steering column 12 can be made to collapse at a predetermined force and direction by adjusting the above for each or both loops 22 on each side of the steering column 12.

The lower support bracket 18 has a mounting ear 26 extending laterally from one end of the loops 22 for attaching the lower support bracket 18 to vehicle support structure by suitable means such as fasteners (not shown). The lower support bracket 18 also has a tongue 28 extending laterally from each mounting ear 26 toward the steering column 12 and longitudinally generally parallel to the side members 21. The tongues 28 are spaced laterally from the side members 21 and have a slot 30 extending longitudinally from one end thereof. The slot 30 is generally rectangular in shape to form a pair of tangs 31 spaced vertically from each other. The tangs 31 function to hold the capsule insert tabs 33 to be described and provide a fixed kinematic path for the lower portion of the steering column 12 during impact. The tongues 28 have at least one, preferably a pair of darts 32 to reinforce and provide stiffness such that the tangs 31 remain in their proper position as the lower support bracket 18 collapses during a collision.

The lower support bracket 18 has a capsule insert tabs 33 disposed in each slot 30. The capsule insert 33 is made of a plastic material and are generally rectangular in shape. The capsule insert tabs 33 have a recess 33a along an upper and lower portion thereof to form a generally U-shaped cross section to allow a portion of the tangs 31 to be disposed therebetween. The side members 21 have a push-out tab 33b located adjacent one end of the capsule insert tabs 33 to provide an initial resistance to movement of the capsule insert tabs 33 along the tangs 31. The lower support bracket 18 has a pivot bolt 34 extending through the capsule insert tabs 33 and the side members 21 and the sleeve 14 of the steering column 12 and secured by a washer 35 and nut 36 at one end. The pivot bolt 34 is oversized to shave material forming an aperture in the capsule insert tabs 33 through which the pivot bolt 34 extends to provide a zero (0) tolerance fit. It should be appreciated that the pivot bolt 34 attaches the steering column 12 to the lower support bracket 18 and is orientated generally perpendicular to the longitudinal axis of the steering column 12. Preferably, the lower support bracket 18 is made as one-piece from a metal material. It should also be appreciated that the lower support bracket 18 mirrors itself on either side of a vertical plane formed by the longitudinal axis of the steering column 12.

In operation, during a collision, the impact of the collision causes the steering column 12 to push on the pivot bolt 34. Due to the force reduction offset 24, the loops 22 bend laterally toward and contact the sleeve 14 of the steering column 12. The loops 22 are forced to unroll and keep the motion of the steering column 12 along its longitudinal axis. The pivot bolt 34 remains fixed in the capsule insert tabs 33 which are guided by the tangs 31 away from the operator of the vehicle and roughly parallel to a horizontal orientation (although other orientations may be used). This motion causes the steering column 12 to pivot down when collapsing.

Figure 4:
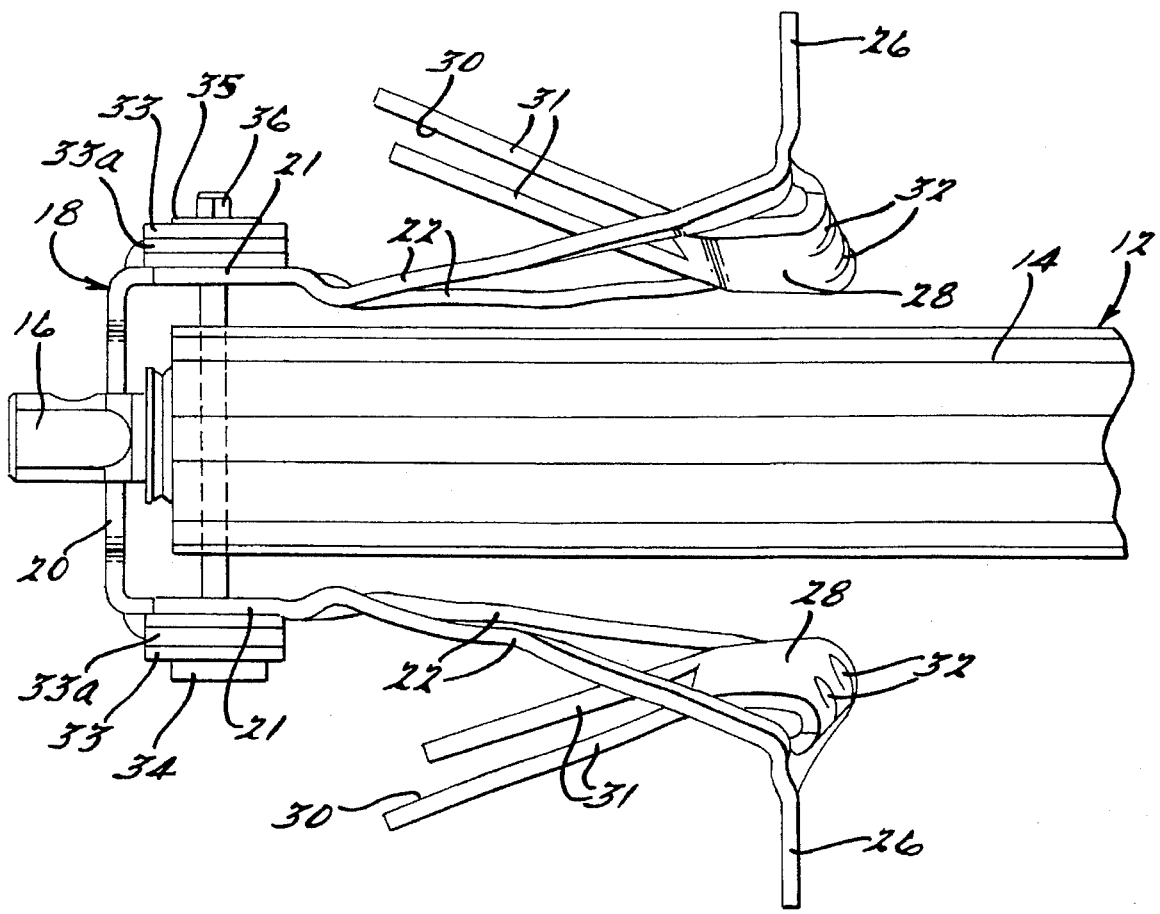
FIG. 4 is a plan view of a portion of the steering column assembly of FIG. 1 after a collision.
Figure 5:
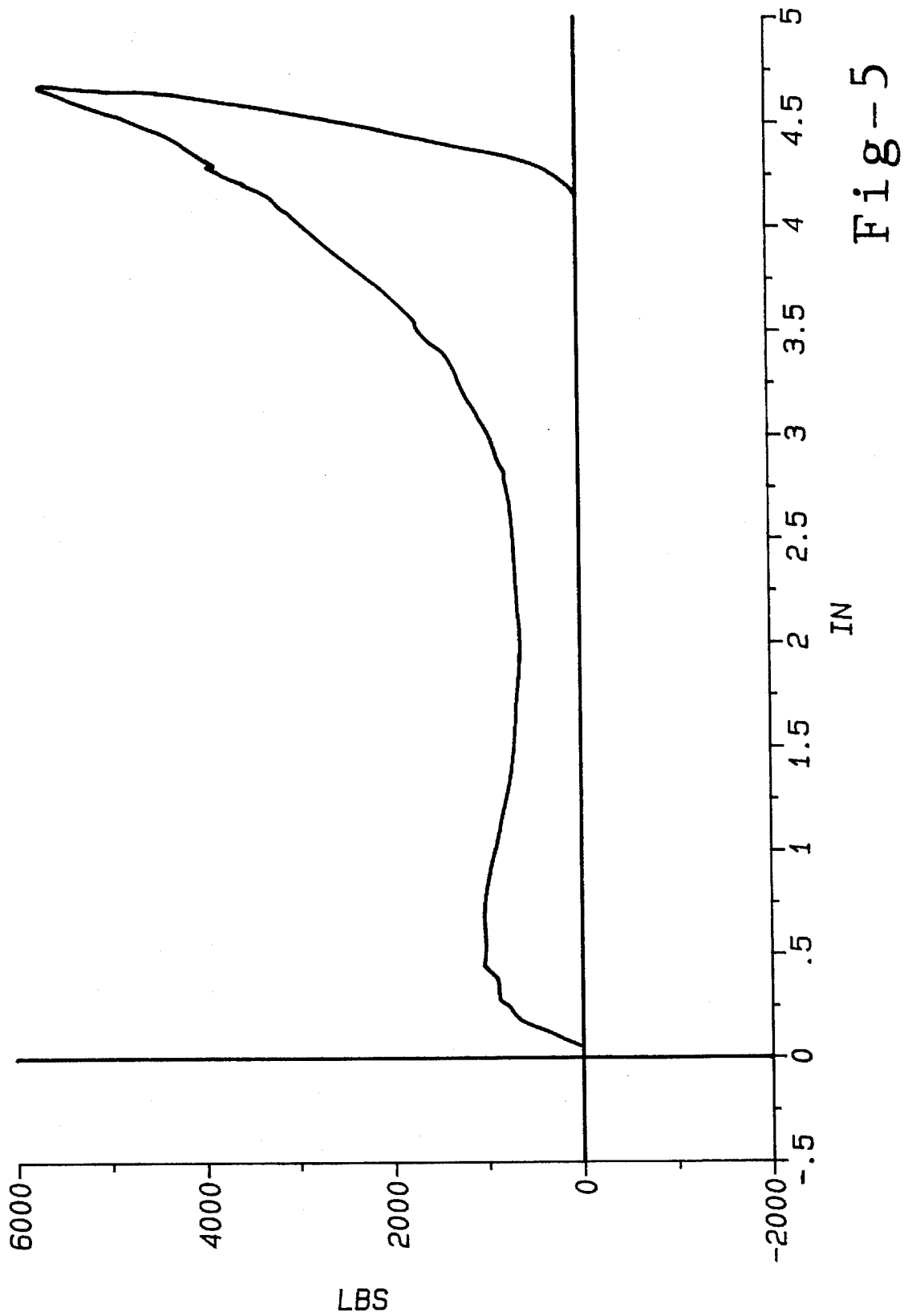
FIG. 5 is a view of a graph of force versus deflection for the portion of FIG. 4 during a collision.
Figure 6:
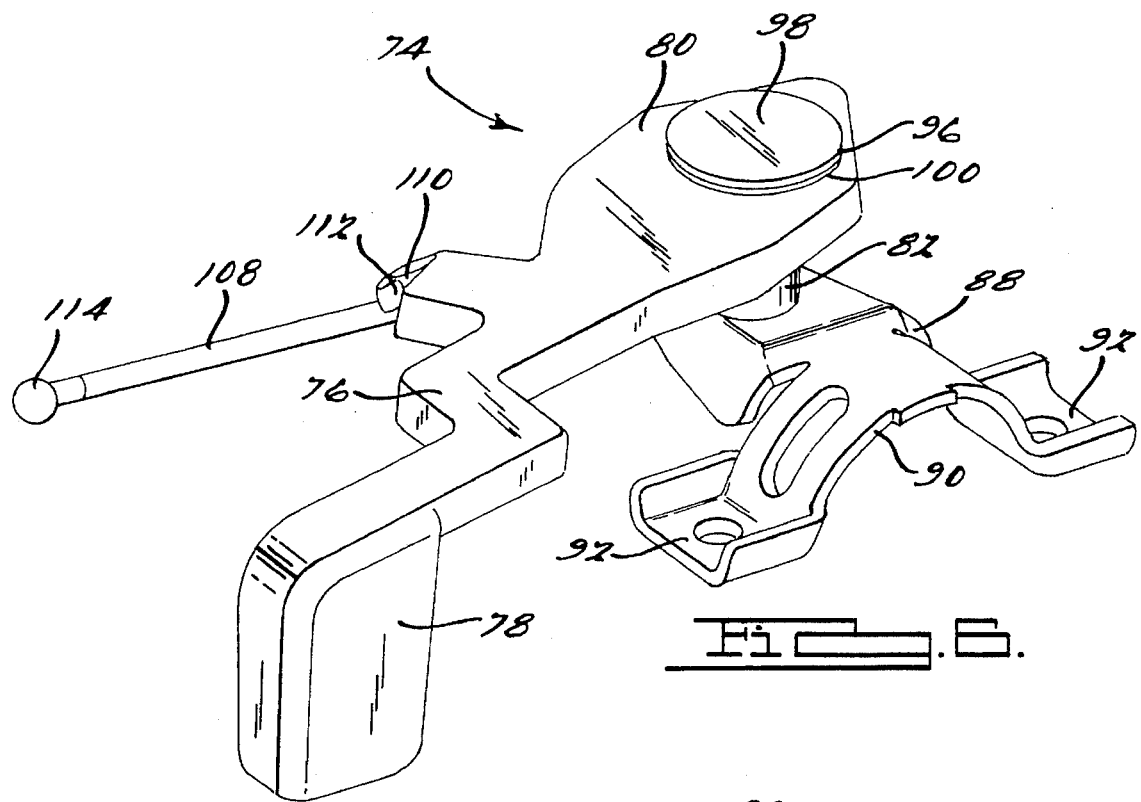
FIG. 6 is a perspective view of another portion of the steering column assembly of FIG. 1.
Figure 7:
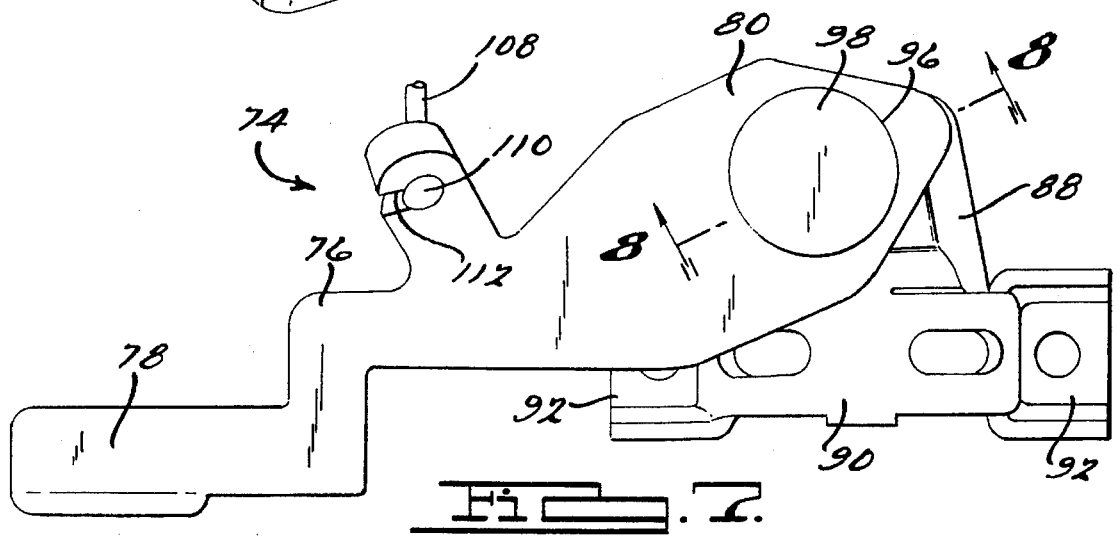
FIG. 7 is a plan view of the portion of FIG. 6.

As illustrated in FIG. 4, the loops 22 of the lower support bracket 18 unroll approximately one hundred eighty degrees (180°). The capsule insert tabs 33 exit the slot 30 and disengage the tangs 31. The pivot bolt 34 remains with the capsule tab inserts 32 and side members 21. The lower support bracket 18 produces a force versus deflection curve as illustrated in FIG. 5. The offsets 24 allow the loops to deflect laterally to produce a low initial force at the beginning of the curve for a relatively constant force versus deflection during a collision.

Referring to FIGS. 1 through 3, the steering column assembly 10 includes an upper mounting mechanism, generally indicated at 38, for attaching an upper portion of the steering column 12 to vehicle support structure such as the dash panel. The upper mounting mechanism 38 is used in conjunction with the lower support bracket 18 as the upper pivot for the steering column 12. The upper mounting mechanism 38 supports the steering column 12 at any desired attitude and allows the steering column 12 to pivot downwardly during a collision.

The mounting mechanism 38 includes a housing 40 which is attached to vehicle support structure by suitable means such as fasteners (not shown). The housing 40 is generally rectangular in shape and made of a plastic material. The mounting mechanism 38 includes a torque bar 42 placed above and orientated generally perpendicular to the longitudinal axis of the steering column 12. The torque bar 42 has a general U-shape with a first end 44 extending through a passage 46 of the housing 40. The torque bar 42 has a second end 48 having a length longer than the first end 44 and extending on the other side of the longitudinal axis of the steering column 12. The second end 48 extends through a passage 50 in the housing 40. The passages 46 and 50 are formed such that the torque bar 42 shaves material from the housing 40 when extended through the passages 46 and 50 to provide a zero (0) tolerance fit.

The mounting mechanism 38 also includes a swing arm 52 pivotally attached to the torque bar 42. The swing arm 52 has a first end 54 extending laterally through a passage 55 of the housing 40. The first end 54 has a cavity 56 therein for receiving the second end 48 of the torque bar 42. The swing arm 52 bends from the first end 54 and has a central portion 58 extending diagonally toward and below the longitudinal axis of the steering column 12. The swing arm 52 has a severe bend to form a second end 60 which extends generally vertically. The second end 60 has an aperture 62 extending diametrically therethrough to allow the second end 48 of the torque bar 42 to extend through the second end 60 of the swing arm 52. The swing arm 52 is a tubular member made of a metal material such as aluminum or an alloy thereof. It should be appreciated that the swing arm 52 pivots about the torque bar 42.

The mounting mechanism 38 may include a locking mechanism 64 attached to the second end 60 of the swing arm 52 to allow the steering column 12 to be of a tilt type. The locking mechanism 64 has a double acting spring 66 disposed about the second end 60 to solidly grip the swing arm 52. The locking mechanism 64 also has an actuating member 68 disposed about the spring 66. The actuating member 68 may be rotated to release the spring 66 and move the locking mechanism 64 along the second end 60 of the swing arm 52 and rotated in the opposite direction to lock the spring 66 and locking mechanism 64 in place along the second end 60 of the swing arm 52. The locking mechanism 64 also includes a housing 69 disposed about the spring 66 and a support bar 70 extending laterally from the housing 69 and through the sleeve 14 of the steering column 12. The support bar 70 has an end which is threaded and is prevented from exiting the sleeve 14 by a nut 72 threadably engaged thereto. The locking mechanism 64 is commercially available from P. L. Porter Co., ASG of Southfield, Mich. It should be appreciated that the locking mechanism 64 causes the tilt of the steering column 12 to rise or fall as the hocking mechanism 64 is slid up or down along the second end 60 of the swing arm 52. It should also be appreciated that the tilt of the steering column 12 is infinitely adjustable by movement of the locking mechanism 64 along the second end 60 of the swing arm 52.

The mounting mechanism 38 may include a spring 73 to urge the steering column 12 toward the housing 40. The spring 73 has one end disposed about the torque bar 42 and the other end extending through an aperture in the support bar 70. It should be appreciated that the steering column 12 is urged upwardly by the spring 73 when the locking mechanism 64 is released.

If the steering column 12 is of the non-tilt type, the locking mechanism 64 is eliminated and the second end 60 of the swing arm 52 is configured to extend laterally rather than vertically. The second end 60 replaces the support bar 70 and extends through the sleeve 14 of the steering column 12 and prevented from exiting by the nut 72. Also, a support member (not shown) pivotally interconnects the second end 60 and the torque bar 42. It should be appreciated that the end of the spring 73 would extend through an aperture in the second end 60.

In operation, during a collision, the impact of the collision causes the steering column 12 to move along its longitudinal axis. As the steering column 12 moves, the swing arm 52 pivots about the torque bar 42 to swing the steering column 12 downwardly away from the operator. The swing arm 52 moves the upper pivot on the steering column 12 in an arc as the steering column 12 collapses back, away from the operator. The mounting mechanism 38 holds the steering column 12 through the entire collision and is not released.

Figure 9:
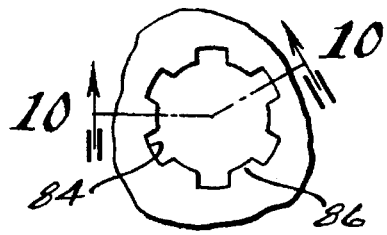
FIGS. 9 and 10 show bushing detail.
Figure 10:
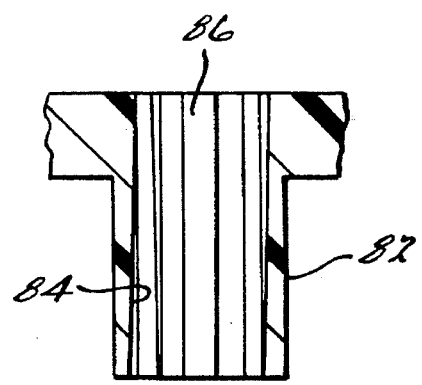
Figure 8:
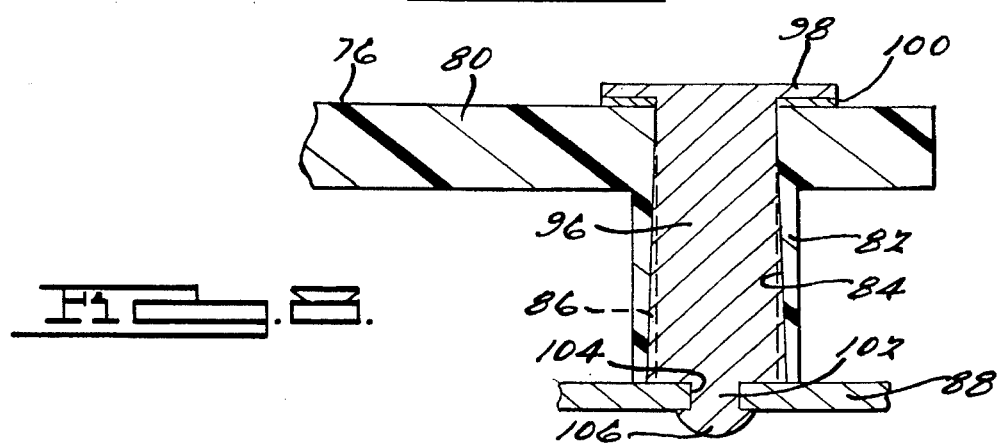
FIG. 8 is a sectional view taken along line 8—8 of FIG. 7.

Referring to FIGS. 1 through 3 and 6 through 8, the steering column assembly 10 may include a tilt release lever assembly 74 for actuating the locking mechanism 64 to allow tilt of the steering column 12. The tilt release lever assembly 74 includes a tilt release lever 76 made as one piece from a plastic material. The tilt release lever 76 has a handle portion 78 for gripping and actuation by the operator. The tilt release lever 76 also has an attachment portion 80 having a bushing 82, as seen in FIGS. 8–10, extending generally perpendicular thereto. The bushing 82 has an aperture 84 extending axially therethrough. The bushing 82 has a plurality of ribs 86 spaced circumferentially about the aperture 84 with alternating reverse tapers, a seen in FIG. 10, for a function to be described.

The tilt release lever assembly 74 also has a clamp member 88 for attachment to the steering column 12. The clamp member 88 has a generally inverted U-shaped base 90 with a flange 92 extending laterally. The flanges 92 are secured to the steering column 12 by suitable means such as fasteners 94. The tilt release lever assembly 74 includes a pivot pin 96 extending through the aperture 84 of the bushing 82. The pivot pin 96 has a head portion 98 which sandwiches a wave washer 100 adjacent the attachment portion 80 of the tilt release lever 76. The pivot pin 96 shaves material from the ribs 86 to provide a zero (0) tolerance fit. The end 102 of the pivot pin 96 extends through an aperture 104 in the clamp member 88 and secured by a rivet head 106 which is formed by orbital riveting to prevent the end 102 from exiting the aperture 104.

The tilt release lever assembly 74 also has a tension rod or link 108 interconnecting the tilt release lever 76 and the locking mechanism 64. The link 108 has a first end 110 that is disposed in a slot 112 of the tilt release lever 76 and a second end 114 that is disposed in a slot 116 of the actuating member 68 of the locking mechanism 64.

In operation, the tilt release lever 76 is pulled toward the operator, in turn, pulling on the tension rod 108 and actuating member 68, thereby releasing the spring 66. Actuation of the tilt release lever 76 frees the steering column 12 to be tilted by the operator. Once the steering column 12 is at a desired tilt, the tilt release lever 76 is released and the spring 66 pulls on the actuating member 68 and tension rod 108 to move the tilt release lever 76 to its original position.

Accordingly, the steering column assembly 10 may be of the tilt type by providing a tilt release and of the non-tilt type by eliminating the tilt release lever 76, tension rod 108 and locking mechanism 64. In either type, the steering column assembly 10 still retains the ability to swing the steering column 12 down on impact. It should be appreciated that the tension rod 108 and tilt release lever 76 may be easily added subsequently as desired to provide the tilt feature.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A steering column assembly for a collapsible energy absorbing steering column comprising:

a lower support bracket for pivotally attaching a lower portion of the steering column to vehicle support structure;

an upper mounting mechanism for pivotally attaching an upper portion of the steering column to vehicle support structure;

locking means for locking the steering column in a plurality of tilt positions relative to said upper mounting mechanism;

tilt release lever means for actuating said locking means to allow the steering column to be tilted to a desired position and locked in place;

said tilt release lever means including a tilt release lever being made as one-piece from a plastic material, said tilt release lever means comprising a clamp bracket attached to the steering column and a pivot pin for pivotally attaching the tilt release lever to said clamp bracket, said tilt release lever having a handle portion at one end and an attachment portion at the other end, said attachment portion having a bushing extending generally perpendicular with an aperture extending axially therethrough, and said bushing having a plurality of ribs extending axially and spaced circumferentially along said aperture, said ribs having alternating reverse tapers.

2. A steering column assembly as set forth in claim 1 wherein said pivot pin has a head portion adjacent said attachment portion and extending through said aperture and removing material from said ribs and having an end portion extending through said clamp bracket.

3. A steering column assembly as set forth in claim 2 including means for retaining said portion end to said clamp bracket.

4. A steering column assembly as set forth in claim 2 including means for axially loading said pivot pin.

5. A steering column assembly as set forth in claim 4 wherein said means for axially loading said pivot pin comprises a wave washer disposed between said head portion and said attachment portion.

6. A steering column assembly for a collapsible energy absorbing steering column comprising:

a lower support bracket for pivotally attaching a lower portion of the steering column to vehicle support structure;

an upper mounting mechanism for pivotally attaching an upper portion of the steering column to vehicle support structure;

locking means for locking the steering column in a plurality of tilt positions relative to said upper mounting mechanism;

tilt release lever means for actuating said locking means to allow the steering column to be tilted to a desired position and locked in place;

said tilt release lever means comprising a tilt release lever being made as one-piece from a plastic material, a clamp bracket attached to the steering column, and a pivot pin for pivotally attaching the tilt release lever to said clamp bracket;

said tilt release lever having a handle portion at one end and an attachment portion at the other end, said attachment portion having a bushing extending generally perpendicular thereto with an aperture extending axially therethrough, said bushing having a plurality of ribs extending axially and spaced circumferentially along said aperture, said ribs having alternating reverse tapers; and said pivot pin having a head portion adjacent said attachment portion and extending through said aperture and removing material from said ribs and having an end portion attached to said clamp bracket.

7. A steering column assembly as set forth in claim 4 including a wave washer disposed between said head portion and said attachment portion for axially loading said pivot pin.

8. A steering column assembly for a collapsible energy absorbing steering column comprising:

a lower support bracket for pivotally attaching a lower portion of the steering column to vehicle support structure;

an upper mounting mechanism for pivotally attaching an upper portion of the steering column to vehicle support structure;

locking means for locking the steering column in a plurality of tilt positions relative to said upper mounting mechanism;

tilt release lever means for actuating said locking means to allow the steering column to be tilted to a desired position and locked in place;

said tilt release lever means comprising a tilt release lever being made as one-piece from a plastic material, a clamp bracket attached to the steering column, and a pivot pin for pivotally attaching the tilt release lever to said clamp bracket;

said tilt release lever having a handle portion at one end and an attachment portion at the other end, said attachment portion having a bushing extending perpendicularly outwardly with an aperture extending axially therethrough, said bushing has a plurality of ribs extending axially and spaced circumferentially along said aperture, said ribs having alternating reverse tapers;

said pivot pin having a head portion adjacent said attachment portion and extending through said aperture and removing material from said ribs and having an end portion;

means for retaining said end portion to said clamp bracket; and a wave washer disposed between said head portion and said attachment portion for axially loading said pivot pin.

9. A steering column assembly for a collapsible energy absorbing steering column comprising:

a lower support bracket for pivotally attaching a lower portion of the steering column to vehicle support structure;

an upper mounting mechanism for pivotally attaching an upper portion of the steering column to vehicle support structure;

locking means for locking the steering column in a plurality of tilt positions relative to said upper mounting mechanism;

tilt release lever means for actuating said locking means to allow the steering column to be tilted to a desired position and locked in place;

said tilt release lever means including a tilt release lever, said tilt release lever means also comprising a clamp bracket attached to the steering column and a pivot pin for pivotally attaching the tilt release lever to said clamp bracket, said tilt release lever having a handle portion at one end and an attachment portion at the other end;

said attachment portion having a bushing extending generally perpendicular with an aperture extending axially therethrough; and said bushing having a plurality of ribs extending axially and spaced circumferentially along said aperture, said ribs having alternating reverse tapers.

* * * * *